M. A. M. HAUPT.
EDUCATIONAL APPARATUS.
APPLICATION FILED JUNE 4, 1920.

1,394,620.

Patented Oct. 25, 1921.

Inventor:
Mary Alden Morgan Haupt
By Offield, Poole & Hinton
Attys

UNITED STATES PATENT OFFICE.

MARY ALDEN MORGAN HAUPT, OF CHICAGO, ILLINOIS.

EDUCATIONAL APPARATUS.

1,394,620.  Specification of Letters Patent.  Patented Oct. 25, 1921.

Application filed June 4, 1920. Serial No. 386,576.

*To all whom it may concern:*

Be it known that I, MARY ALDEN MORGAN HAUPT, a citizen of the United States, and a resident of Chicago, county of Cook, State of Illinois, have invented new and useful Improvements in Educational Apparatus, of which the following is a specification.

This invention relates to educational toys and particularly to an apparatus whereby young children, in play, may be encouraged and taught to recognize words as units and thereby to read.

In the drawings, which represent an illustrative embodiment of the invention;

Figure 1:
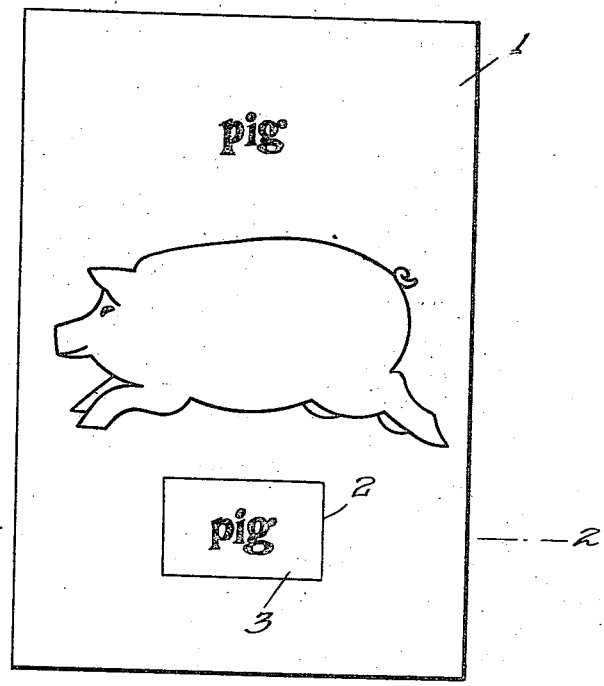
Figure 1 is a plan view of one of the boards and blocks employed.
Figure 2:
Fig. 2 is a cross sectional view on the line 2—2 of Fig. 1.

I provide a series of boards 1 of any suitable material upon each of which is displayed prominently the picture of some particular article or animal, as for instance a pig. Immediately above the picture is printed the name "Pig." Below the picture is a recess 2. I provide a series of blocks 3 which will fit the recess, one of which bears the word "Pig." The child's task is to match the word above the picture with one below it by picking out and inserting the correct block into the recess. In this task the child learns to recognize words as units, each word having a distinct appearance, a method of teaching a child to read far superior to that of teaching him the letters of the alphabet and then to form words by putting those letters together.

In this task the child's attention, it should be noted, is concentrated on the word—it is the word which he must match. Each time, however, he compares the word on the board with that on the block he is attempting to use, he must look at the picture since the picture is between the two. Thus the association of the thing with its name is reinforced and driven home to the fullest possible extent. This association nevertheless is effected largely subconsciously, and there is no diversion of the child's attention from the particular task in hand, which is to remark and remember the appearance of the word "Pig" as a whole so as to be able to recognize this word whenever he sees it and to pick it out from a large number of others.

The use of the apparatus herein disclosed concentrates the attention of the child upon the appearance of a word, establishing therewith by association, the picture of a thing, without confusing therewith other associations or permitting success except by direct comparison of the two duplicate words involved. In the particular illustrative embodiment of the invention herein disclosed, a single picture appears upon each of a series of boards; of course numerous pictures might be presented upon the same board and other modifications made within the scope of the invention.

Having described my invention, I claim:

1. An educational toy comprising a board having thereon a picture, a name corresponding to the picture, and a recess; and a block containing a duplicate of the name and adapted to fit into the recess, said first mentioned name and recess being on opposite sides of the picture.

2. An educational toy comprising a board having thereon a picture, and a recess; a name corresponding to the picture, a series of blocks each bearing a name, one of said names being a duplicate of the first mentioned name, others being different, a plurality of said blocks being adapted to fit into said recess.

3. An educational toy comprising a board having thereon a picture, a name corresponding to the picture, and a recess; a series of blocks each bearing a name, one of said names being a duplicate of the first mentioned name, a plurality of said blocks being adapted to fit into said recess, said first mentioned name and recess being on opposite sides of the picture.

4. An educational toy comprising a board having a word thereon, and a recess; a plurality of blocks each containing a word, including said first mentioned word and others and each adapted to fit into the recess.

5. An educational toy, comprising a board having a picture thereon, a name corresponding to the picture fixed to the board above the picture, and a recess below the picture, and a plurality of blocks, one thereof containing a duplicate of said name, each of said blocks being adapted to be fitted by a child into said recess.

In witness whereof, I hereunto subscribe my name this 21st day of May, A. D., 1920.

MARY ALDEN MORGAN HAUPT.